(No Model.)
C. P. HOUTSMA.
DRAFT EQUALIZER.
No. 559,286. Patented Apr. 28, 1896.
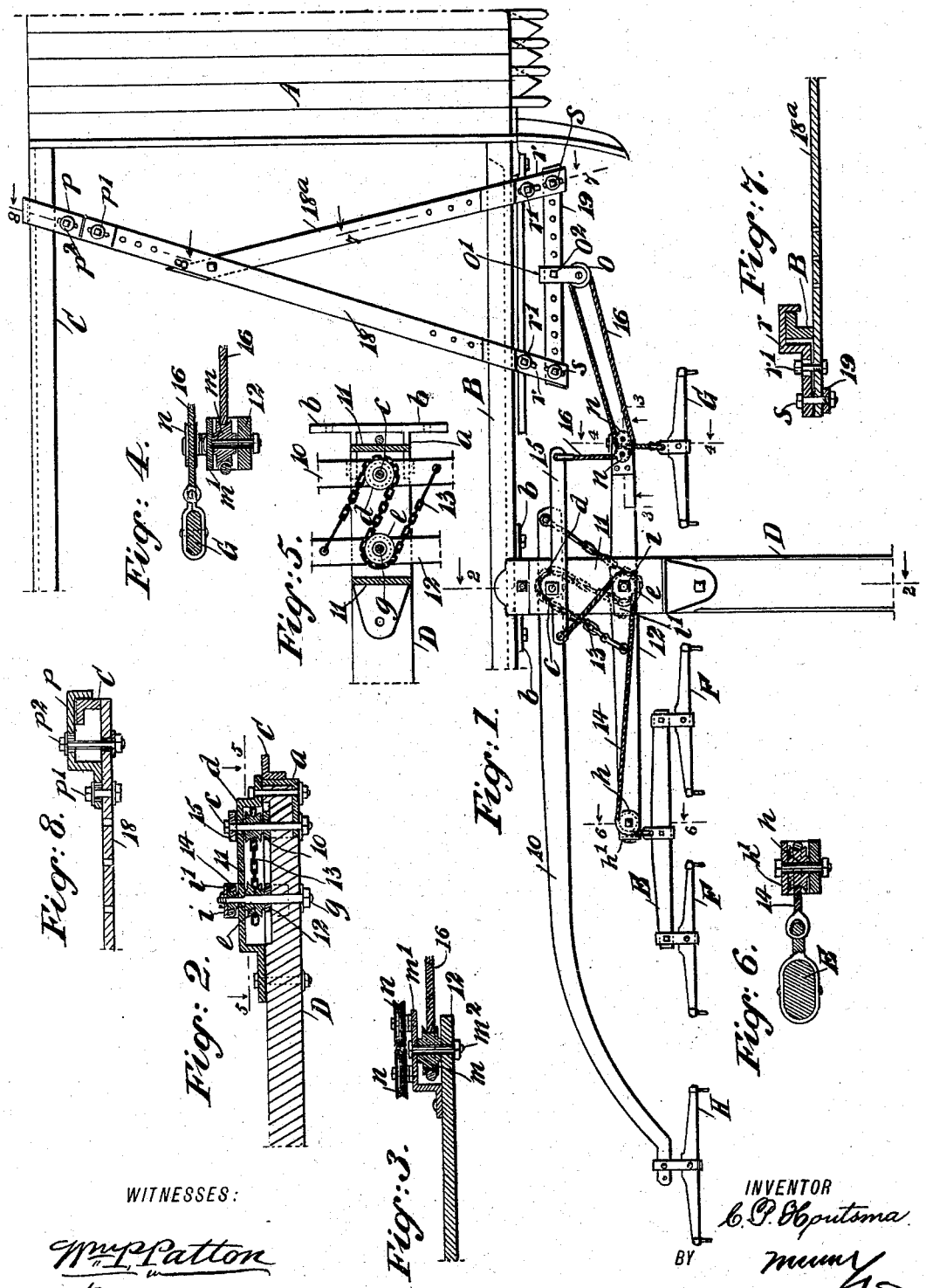
WITNESSES:
Wm. P. Patton
F. W. Hanaford
INVENTOR
C. P. Houtsma
BY
ATTORNEYS.

UNITED STATES PATENT OFFICE.

CORNELIUS P. HOUTSMA, OF SIOUX CENTRE, IOWA.

DRAFT-EQUALIZER.

SPECIFICATION forming part of Letters Patent No. 559,286, dated April 28, 1896.

Application filed January 23, 1896. Serial No. 576,552. (No model.)

*To all whom it may concern:*

Be it known that I, CORNELIUS P. HOUTSMA, of Sioux Centre, in the county of Sioux and State of Iowa, have invented new and useful Improvements in Draft-Equalizers, of which the following is a full, clear, and exact description.

This invention relates to an improved evener or draft-equalizer employed to evenly distribute the draft force of four horses, as applied for drawing a grain-harvester, mowing-machine, or other agricultural implement having a tongue and requiring four horses to move it over the ground.

The improvement is of a class wherein three horses or other draft-animals are placed at one side of the tongue and one on the opposite side of the same, all connected with the machine for its progressive movement.

The objects of the invention are to provide simple novel features of construction for a device of the indicated character which will adapt it for very effective service as a distributer of draft force, and also correct tendency to side draft on the machine which might otherwise result from the disposal of three draft-animals at the outside of the tongue of the machine.

A further object is to provide novel and simple means for the ready attachment of the draft-equalizer to the frame of a grain-harvester, which will dispense with the necessity of employing machine-tools to effect such a connection of parts.

The invention consists, essentially, in the construction and combination of parts, as is hereinafter described, and defined in the claims.

Reference is to be had to the accompanying drawings, forming a part of this specification, in which similar characters of reference indicate corresponding parts in all the figures.

Figure 1 is a plan view of the improved draft-equalizer applied to the frame of a grain-harvester, shown in part. Fig. 2 is a longitudinal sectional view of the tongue in part and of novel details of construction that are parts of the equalizer device, taken substantially on the line 2 2 in Fig. 1. Fig. 3 is an enlarged sectional front edge view of an end portion of a spreader-bar and of attachments thereto, substantially on the line 3 3 in Fig. 1. Fig. 4 is a transverse sectional view of the details shown in Fig. 3, essentially on the line 4 4 in Fig. 1. Fig. 5 is a partly-sectional plan view of details of construction which are parts of the improvement, substantially on the line 5 5 in Fig. 2. Fig. 6 is an enlarged transverse sectional view on the line 6 6 in Fig. 1. Fig. 7 is a longitudinal sectional view of details on the line 7 7 in Fig. 1, showing preferred means for clamping a novel draft-hitch on the frame of a grain-harvester; and Fig. 8 is a longitudinal sectional view of another clamping device for said draft-hitch, taken on the line 8 8 in Fig. 1.

In the embodiment of my invention as illustrated, where its application is shown in connection with a grain-harvester, A indicates the platform of such a machine, and B C, respectively, the front and rear parallel frame-bars which support said platform.

On the front frame-bar B a tongue D is affixed in a substantial manner, preferably with a shoe-casting $a$, having lateral projections $b$, that are bolted to the frame-bar and firmly secure the tongue projected forwardly therefrom at right angles with the same, as shown in Figs. 1 and 2. On the tongue D near its point of attachment to the frame-bar B the single-horse draft-bar 10 is pivoted, having a short portion projecting toward the platform A that is on the right side of the tongue considered from the front of the harvester.

The pivot-bolt $c$ of the draft-bar 10 projects through the tongue D, and also through the bracket-plate 11, that has two depending legs suitably spaced apart, whereon are pads which are seated on and bolted to the tongue, so that a recess is provided wherein the draft-bar 10 may rock on its bolt.

In front of the draft-bar 10 a spreader-bar 12 is pivoted on the tongue D, passing through the recess afforded by the bracket-plate 11, portions of the spreader-bar extending each side of the tongue, as best shown in Fig. 1. The limb of the spreader-bar 12 that is located on the left side of the tongue D, viewed from the front, exceeds in length the portion thereof that extends at the right side of the tongue.

Sufficient space is provided in the recess of the bracket-plate 11 for the reception of two peripherally-grooved pulleys $d$ and $e$, that are located, respectively, on the single-horse draft-bar 10 and the spreader-bar 12, the pivot-bolt c of the draft-bar and also the pivot-bolt g of the spreader-bar passing through these grooved pulleys, so as to loosely secure them in position between the bracket-plate 11 and the bars mentioned.

To the right-hand end of the draft-bar 10 a chain or other flexible connection 13 is loosely secured by one of its ends, and thence is extended to wrap partly around the grooved pulley e at its forward portion, from which the chain is rearwardly drawn around the rearward edge portion of the grooved pulley d, and thence forwardly to have its remaining extremity shackled to the longer limb of the spreader-bar 12, that projects at the left side of the tongue D, as represented in Figs. 1 and 5. On the left-hand limb of the spreader-bar 12 a doubletree E and pair of singletrees F are sustained near the outer end of the said limb by engagement of a wire rope or like flexible connection 14 with a loose pulley h, that is pivoted on the end of the spreader-bar, the said rope being attached by one end to the longitudinal center of the doubletree, as clearly shown in Fig. 1, and a guard-plate h' is secured on the end of the spreader-bar 12, so as to project over the rope 14 and hold it from displacement.

From the loose pulley h the draft-rope 14 is extended toward the tongue D and is partially wrapped around the loose pulley i, that is held to rotate on the upper side of the bracket-plate 11 by the pivot-bolt g, which is upwardly lengthened sufficiently to receive the pulley mentioned and also to pass through a guard-plate i', that is attached to the spreader-bar and projects over the pulley h, so as to prevent a displacement of the rope 14. From the pulley i draft-rope 14 is drawn rearwardly and toward the left side of the tongue D, the extremity of this end portion of the wire rope named being connected with one end of an evener bar or lever 15.

As shown in Figs. 1 and 2, the evener-lever 15 is pivoted between its ends on the bracket-plate 11, having a short member thereof extended beyond the left side of the tongue D and a longer member projected at the right side of said tongue, the diagonally-trending rear portion of the draft-rope 14 being loosely secured to the extremity of the left-hand limb of the evener-lever, as before mentioned.

A sufficient length is afforded the single-horse draft-bar 10 to adapt it to suitably project beyond the outermost singletree F of the pair on the doubletree E, and on this portion of said draft-bar, which is preferably bent forward, a singletree H is shackled, room for free movement of draft-animals that are hitched to the singletrees F F and H being provided between said singletrees.

On the right-hand member of the spreader-bar 12 provision is made for the connection with the end of the said member of a draft-rope 16, that has one end shackled to the right-hand end of the evener-lever 15, and the said connecting device is preferably constructed as shown in Figs. 1, 3, and 4, comprising the following-described parts: A grooved pulley m is pivoted on the end portion of the spreader-bar, between said bar and a keeper-plate m', that is bent into form as best shown in Fig. 3, having a horizontal member held spaced from the upper side of the spreader-bar by an upright integral web that is joined by its lower end with a foot or pad, which is secured on the evener-lever a correct distance from the pulley m. The pivot-bolt $m^2$, that holds the pulley m in position, passes through the keeper-plate m', so that the pulley is free to rotate as an idler for engagement of the draft-rope 16.

On the keeper-plate m' two grooved pulleys n are held to revolve by their loose engagement with central pivot-studs that project from the keeper-plate, which studs are spaced apart so as to support the grooved peripheries of the pulleys they engage with adjacent to each other, while the pulleys occupy the same horizontal plane. As before indicated, the draft-rope 16 extends from the right-hand end of the evener-lever 15 toward the pulley m, which it has contact with, and after a wrapped engagement therewith on the front side of its grooved periphery is drawn toward the platform A of the machine to be wrapped partly around a loose pulley o, that is held projected from a novel draft-hitch frame that has a clamped engagement with the frame-bars B C, as will presently be described.

From the loose pulley o the draft-rope 16 trends toward the loose grooved pulleys n and is passed between their adjacent peripheral portions, which afford loose support for said rope and permit the portion that passes forward therefrom to be shackled to the singletree G, that is thus sustained on the spreader-bar 12, so as to have ample clearance from the tongue D.

The draft-hitch frame before mentioned comprises two preferably flat bars 18 $18^a$, that are secured together, as shown in Fig. 1, the bar $18^a$ having its rear end bolted to the longer bar 18, between the ends of the latter. The rear end of the hitch-bar 18 is clamped to the frame-bar C of the harvester, preferably by the means shown clearly in Figs. 1 and 8, consisting of an angularly-bent clip-plate p, which is furnished with a hook on one end that depends at the rear side of the frame-bar when said clip-plate is seated on the upper side of the frame-bar.

The forward end of the clip-plate is seated on the top surface of the hitch-bar 18 and is bolted thereto with a bolt p'. Another bolt $p^2$ passes through a slot or other perforation of the clip-plate and then through the hitch-plate, the location of the end portion of the latter beneath the frame-bar C adapting the bolt $p^2$ to clamp the hitch-bar firmly on the frame-bar when a nut on the end of the said bolt is adjusted to effect such a result. The forward ends of the jointed bars 18 $18^a$ are projected a short distance in advance of the front frame-bar B and are connected together by a cross-bar 19. The front portions of the bars 18 18ᵃ are drawn against the lower side of the frame-bar B by two similar clamps, one for each bar, and, as shown in Figs. 1 and 7, said clamps are substantially similar with the clamping device provided to secure the rear end of the bar 18 upon the rear frame-bar C. In like manner with the clamp mentioned the forward clamps have each a clip-plate r, that presses on the upper side of the frame-bar B when the clamping-bolts r' and nuts therefor are adjusted for such a purpose, and at the forward ends of the clip-plates other bolts s serve to secure these plates on the front ends of the hitch-bars 18 18ᵃ and also hold the cross-bar 19 clamped on said bars. A series of spaced perforations are formed in the bars 18 18ᵃ to permit the position of the clamps on their ends to be shifted, which provision facilitates the proper attachment of the hitch-frame upon different platforms A, that may vary in width from front to rear edges of the same, or in other words have their front and rear frame-bars differently spaced apart.

The loose pulley o before mentioned is held for longitudinal adjustment along the cross-bar 19, as its service may require, by furnishing the pulley with a looped frame o', which is adapted to slide on said bar and be secured thereto by a bolt o², which can pass through any one of a series of spaced perforations in the cross-bar and through alined perforations of the frame that may be caused to register with an appropriate perforation of the cross-bar, so that the position of the pulley o may be altered to locate it a correct distance from the platform A.

From the foregoing description it will be seen that the harnessed engagement of horses or other draft-animals with the singletrees F F, G, and H will dispose the double team in a line parallel with the frame of the harvester for easy control by a driver.

The operation of the draft-equalizer is as follows: The length of the single-horse draft-bar 10 is so proportioned that the transmission of draft force from the short limb of said arm, which projects at the right side of the tongue through the chain 13 to the left-hand limb of the spreader-bar 12, will adapt the pull of the horse hitched to singletree H to measurably counteract the side pull of the pair of horses that are harnessed to the singletrees F. It will also be noticed that the excess of leverage afforded the evener-lever 15 at the right side of the tongue D permits a portion of draft force exerted by the single horse hitched to the singletree G to be transmitted through the draft-ropes 14 and 16 to the doubletree E and singletrees F thereon. As the draft-rope 16 is extended toward the platform A for engagement with the loose pulley o, it will be evident that the force of a draft-animal that pulls on the singletree G will be divided between the hitch-frame cross-bar 19 and right-hand end of the evener-lever 15.

In construction of the improvement it is essential to so proportion the length of the draft-bar 10, spreader-bar 12, and evener-lever 15, and so locate pivot-points of the same on the tongue D, that the draft force of the double team hitched to the doubletree E will be evened by the draft force of the other two draft-animals, and all side draft on the harvester be counteracted, so that the machine may be drawn steadily and be guided with ease in any desired direction.

It is claimed for the novel manner of connecting the singletree G at the right of the tongue, by clamping the hitch-frame on the machine without the necessity of drilling holes in the frame-bars of the harvester, that this is of great utility, as it enables the owner of the machine to attach the improvement thereto in an easy and expeditious manner. Furthermore, the lateral extension of the draft-rope 16 to engage it with the pulley o transmits a portion of the draft force of the animal pulling on the singletree G to a point so far removed from the right side of the tongue D that the counteraction of side draft produced by pull of the other animals is greatly aided and the draft-equalizer is rendered more efficient in operation.

Having thus described my invention, I claim as new and desire to secure by Letters Patent—

1. In a draft-equalizer, the combination with a tongue suitably attached to a machine to be drawn, of a single-horse draft-bar pivoted on the tongue so as to project a short limb at one side thereof, and a long limb oppositely therefrom, a spreader-bar pivoted on the tongue forward of the draft-bar, a taut flexible connection extending partially around two loose pulleys on the tongue, and having one end thereof fast to the short limb of the draft-bar, its other end being secured to the long limb of the spreader-bar near the tongue, an evener-bar pivoted on the tongue nearer one end of said bar, and flexible connections substantially as described between the evener-bar spreader-bar and hitch-frame, as specified.

2. In a draft-equalizer, the combination with a tongue, a looped bracket-plate secured thereon forming a recess, a draft-bar pivoted in said recess having a long limb on one side of the tongue and a short limb on the opposite side thereof, a spreader-bar also pivoted in the recess in advance of the draft-bar, and an evener-bar pivoted on the upper side of the bracket-plate having a long limb projected away from the long limb of the draft-bar, of loose pulleys pivoted on the same pintles with the draft-bar and spreader-bar in the recess and on said bars, a taut flexible connection extended from the short end of the draft-bar partly around each loose pulley, and thence to be attached to the longer arm of the spreader-bar near the tongue, a flexible device adapted to connect the long end of the evener-bar with a machine to be drawn, and also with a singletree, and another flexible device attached by one end to the short member of the evener-bar, thence extended over a loose pulley on the bracket-plate, and thence to a pulley on the long arm of the spreader-bar having its end attached to a doubletree, supporting two singletrees, as specified.

3. In a draft-equalizer, the combination with a single-horse draft-bar, a spreader-bar, and an evener-lever all pivoted on a tongue; the spreader-bar in front of the draft-bar and the evener-lever above said draft-bar, the evener-lever having a longer limb extending at the right side of the tongue, and the draft-bar and spreader-bar provided with a longer limb on the left side of the tongue; of a singletree on the long end of the draft-bar; a doubletree and two singletrees supported by the longer limb of the spreader-bar; a singletree sustained on the end of the spreader-bar at the right side of the tongue; a flexible connection between the longer end of the evener-lever and said singletree, which connection is doubled and engages its bight with a pulley held to revolve on the frame of the machine to be drawn; and a flexible connection fast by one end on the short limb of the evener-lever, secured by its other end to the doubletree and loosely engaging this end portion with a pulley on the left-hand end of the spreader-bar, the intermediate portion of said flexible connection loosely engaging a loose pulley pivoted on the tongue, substantially as described.

4. In a draft-equalizer, the combination with a grain-cutting-machine frame, of an adjustable hitch-frame for the connection therewith of a draft-equalizer device, the said hitch-frame comprising a long draft-bar, a shorter draft-bar secured by its rear end on the longer bar between ends of the latter and diverging therefrom forward, a clamp on the rear end of the long draft-bar adapted to connect said end of the bar with a frame-bar of the grain-cutter, a cross-bar secured at the front ends of the two draft-bars holding them spaced, a clamping device for the front end of each draft-bar adapted to secure said bars to the front frame-bar of the grain-cutter, and a loose pulley adjustable on the cross-bar of the hitch-frame, substantially as described.

CORNELIUS P. HOUTSMA.

Witnesses:
E. N. RUSK,
L. D. HOBSON.